United States Patent Office 3,466,310
Patented Sept. 9, 1969

3,466,310
PREPARATION OF OMEGA-HYDROXY-
ALKANOIC ACIDS
Martin J. Diamond, Oakland, Calif., assignor to the United
States of America as represented by the Secretary of
Agriculture
No Drawing. Continuation-in-part of application Ser. No.
453,228, May 4, 1965. This application July 26, 1967,
Ser. No. 656,634
Int. Cl. C07c *59/20, 59/04;* C11c *3/00*
U.S. Cl. 260—413           15 Claims

ABSTRACT OF THE DISCLOSURE

Ricinoleic acid—or a salt, ester, or amide thereof—is heated at about 178°–210° C. with a strong alkali (NaOH), using as a reaction medium a high-boiling primary or secondary alcohol, such as 1-octanol or 2-octanol, whereby to yield a product containing an enhanced ratio of 10-hydroxydecanoic acid to sebacic acid. The process is also applicable to lesquerolic acid and other hydroxy unsaturated acids having allylic or homoallylic systems with a double bond between the hydroxyl and carboxyl group, and their salts, esters, and amides to yield a product containing an enhanced proportion of the corresponding omega-hydroxyalkanoic acid, e.g., 12-hydroxydodecanoic acid.

---

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of my co-pending application, Ser. No. 453,228, filed May 4, 1965, now abandoned.

This invention relates to and has among its objects the provision of novel processes for preparing omega-hydroxyalkanoic acids, particularly 10-hydroxydecanoic acid and 12-hydroxydodecanoic acid. Further objects of the invention will be evident from the following description wherein parts and percentages are by weight unless otherwise specified.

It is well known in the art that when a compound containing a ricinoleyl radical—e.g., ricinoleic acid, its salts, esters, or amides—is heated in the presence of aqueous alkali there occurs a splitting of the ricinoleyl radical resulting in the formation of various compounds of shorter chain length. It has been shown that two major reactions are involved, as follows:

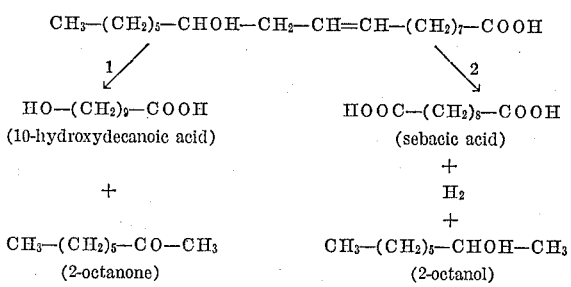

The course of the cleavage may be directed to some extent by control of temperature:

Generally speaking, a high temperature (above 250° C.) favors reaction 2, resulting in almost exclusive formation of sebacic acid (as between sebacic acid and 10-hydroxydecanoic acid). Accordingly, there is no problem in producing good yields of sebacic acid from ricinoleates.

On the other hand, where 10-hydroxydecanoic acid is the desired product (reaction 1), the situation is not so simple. In this event the cleavage is conducted at lower temperatures, e.g., 178–210° C., in order to restrict reaction 2. However, such temperature control alone does not result in exclusive formation of 10-hydroxydecanoic acid; a considerable proportion of sebacic acid is concomitantly produced. In efforts to remedy this situation prior investigators have advocated the use of various media in the reaction system—for example: hydrocarbon solvents such as white mineral oil or lubricating oils, cresols, phenols, chlorinated naphthalenes, etc. Such techniques are shown for example, in U.S. Patents 2,318,762 and 3,084,178 and British Patents 534,321 and 675,434. Despite these innovations, however, the fact remains that the cleavage invariably results in formation of at least as much sebacic acid as the desired hydroxy acid.

It is, therefore, the primary object of the invention to provide an improved process which provides an enhanced yield of hydroxy acid, that is, which provides a higher ratio of hydroxy acid to dibasic acid than could be achieved heretofore.

In accordance with the invention, a compound selected from the group consisting of acids, salts, esters, and amides, which contains the radical—

(I) 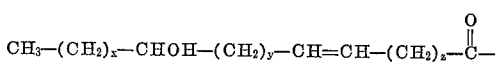

(wherein Y is an integer from 0 to 1, and x and z are each an integer from 0 to 16 with the limitation that the sum of x and z does not exceed 16) is reacted with a strong alkali of a temperature of about 178–210° C. in the presence of a medium consisting chiefly of a monohydroxy primary or secondary alkanol which has a boiling point (at atmospheric pressure) of at least 178° C., typically 1-octanol or 2-octanol.

The key item in the process of the invention is the use of said medium in that it directs the course of the cleavage to yield a reaction product containing a higher ratio of hydroxy acid $$HO\text{—}(CH_2)_{z+2}\text{—}COOH$$

to dibasic acid $$HOOC\text{—}(CH_2)_{z+1}\text{—}COOH$$

than was previously attainable. The advantageous result obtained in accordance with the invention is graphically illustrated by the following equations, wherein x, y, and z have the values stated above:

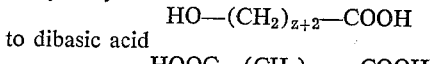

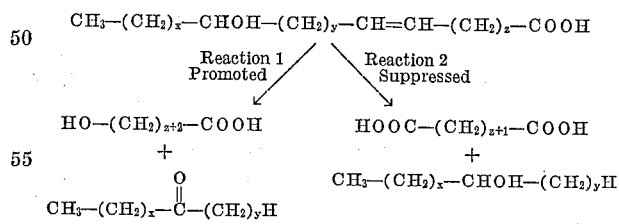

The selective action of the process of the invention is further demonstrated by the following: In experiments involving the cleavage of ricinoleates, the process of the invention has yielded a product with a 10-hydroxydecanoic/sebacic acid ratio of over 7/1 whereas the prior techniques yield ratios on the order of 1/1. Also, in experiments involving the cleavage of lesquerolates ($x=5$, $y=1$, and $z=9$ in Formula I above), the process of the invention has yielded a product with a 12-hydroxydodecanoic/dodecanedioic acid ratio higher than 5.5/1 in contrast to ratios of 1/1 as best obtained using a cresol as the reaction medium. Further experimental data on the superiority of the reaction media of the invention are given in the examples below.

For use in the process of the invention, 2-octanol is generally preferred as it is very effective, relatively inexpensive, and is a normal by-product of the cleavage. However, many other primary or secondary monohydroxy alkanols may be used. Since the reaction is conducted at about 178–210° C., the selected alkanol should have a boiling point (at atmospheric pressure) of at least 178° C. I have observed that especially good results are obtained with alkanols which are unhindered, that is, those which are free from branching on the carbon atoms alpha or beta to the carbon atom which bears the hydroxyl group. For example, such alkanols as 1-octanol or 2-octanol (free from any branching) provide better results than diisobutyl carbinol

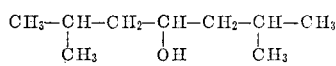

which contains branching on both carbons beta to the carbon atom which bears the hydroxyl group. Illustrative examples of alkanols, in addition to those cited above, which may be used in a practice of the invention are: 5-ethylnonanol-2; 7-ethyl-2-methylundecanol-4; 3,9-diethyltridecanol-6; nonanol-2; nonanol-3; decanol-4; nonanol-1; decanol-1; undecanol-1; and cyclooctanol. Also useful are commercial mixtures of primary and secondary alcohols such as the products sold on the market as isooctanol and isodecanol. Although it in generally preferred to use the alkanol as the sole added medium in the reaction, it is within the broad ambit of the invention to use a reaction medium wherein the alkanol is the chief or major ingredient, the remainder being a conventional inert solvent such as a high-boiling hydrocarbon, typically decalin (decahydronaphthalene), or white mineral oil.

Regarding the mechanism of the primary or secondary alcohol in directing the course of the cleavage, it is believed that the cleavage involves, as an intermediate step, an equilibrium between a Meerwein-Ponndorff reduction and an Oppenauer oxidation. The presence of the excess 2-octanol (or other primary or secondary alcohol) acts according to the law of mass action to shift the equilibrium in the desired direction, i.e., to favor the Meerwein-Ponndorff reduction, resulting in an increased ratio of hydroxy acid to dibasic acid. On the other hand, in the absence of excess primary or secondary alcohol, the formation of dicarboylic acid is favored since evolution of hydrogen causes reaction 2 to be irreversible. Although the above mechanisms are believed to be involved, it is not intended that the invention be limited by these or any other theoretical considerations.

The criticality of the reaction medium used in accordance with the invention is further illustrated by the following: My researchers have shown that tertiary alkanols do not have the desired effect of promoting formation of the omega-hydroxyalkanoic acid, probably because they are decomposed under the conditions of the reaction. Aromatic hydroxy compounds—i.e., phenols and aromatic alcohols—likewise do not display the desired reaction-promoting effect. I have also tested polyhydric alcohols, e.g., glycerine and 1,5-pentanediol, and found them ineffective.

In a pratice of the invention the starting material may be supplied as the unsaturated hydroxy acid per se or in the form of its salts, esters, or amides. Thus, in a typical application to a compound containing the ricinoleyl radical one may employ such compounds as ricinoleic acid (hydrogen ricinoleate); salts of the acid such as sodium or potassium ricinoleate; glycerides such as glycerol triricinoleate; esters of the acid with alkanols, for example, methyl, isopropyl, propyl, and butyl ricinoleates; and ricinoleic acid amides. For convenience the term "ricinoleate" will be used herein to designate these substances as well as the raw materials such as castor oil which contain these substances. In application of the invention to a compound containing the lesquerolate radical, one may employ as the starting material such compounds as lesquerolic acid (hydrogen lesquerolate); salts of the acid such as sodium or potassium lesquerolates; glycerides of the acid such as glycerol trilesquerolate (the principal ingredient of lesquerella oil); esters of the acid with alkanols, for example, methyl, isopropyl, propyl, and butyl lesquerolates; and lesquerolic acid amides. For convenience, the term "lesquerolate" will be used herein to designate these substances as well as the raw materials such as lesquerella oil which contain these substances.

Beyond the use of the special reaction medium, as heretofore described, the reaction is conducted in the same manner as previously applied to ricinoleates. Typically, there is provided a reaction kettle of material resistant to attack by hot caustic, equipped with heating means, stirrer, reflux condenser, etc. The kettle is first charged with the alkanol, alkali, and water. The alkanol is used in excess to function not only as a reaction director but also as a diluent to keep the reaction mixture fluid enough so it can be stirred effectively, thus to keep the various reactants in contact with one another. Assuming that the reaction will involve the use of one mole of unsaturated hydroxy acid or its equivalent (this same basis will be applicable to the other proportions stated below), the alkanol is generally supplied in an amount to provide at least 2 moles thereof, preferably at least 4 moles. A larger proportion of alkanol may be used but will provide little if any added advantage. The alkali—e.g., sodium hydroxide, potassium hydroxide, or mixtures thereof—is provided in amount to furnish at least 2 moles thereof. Preferably an excess is used, i.e., about 4 to 18 moles. Water is provided in relatively small amount to just dissolve the akali or at least convert it from a solid to a fluid condition so that the alkali will properly contact the other substances in the reaction system.

After charging the kettle with the alkanol, caustic, and water, the contents of the kettle are brought to the reaction temperature—about 178–210° C.—and maintained thereat through the course of the reaction, with continuous application of stirring. The starting material—the unsaturated hydroxy acid or equivalent—is fed into the kettle slowly over a period of at least several hours. Usually a reaction period of about 2 to 12 hours is used. Longer times may be employed but offer little added benefit.

After completion of the reaction, the resulting mixture may be treated to isolate the omega-hydroxy alkanoic acid and other products by methods well known in the art.

EXAMPLES

The invention is further demonstrated by the following illustrative examples. In some of the runs, media beyond the scope of the invention—e.g., cresol, glycerol, 2-octanone, decalin, etc.—were employed for comparative purposes.

Example I.—Cleavage of methyl lesquerolate

A series of runs were made in the following manner: The reactions were carried out in a nickel reaction vessel equipped with heating jacket, stirrer, heated dropping funnel, and reflux condenser. The vessel was charged with alkali, water, and organic diluent and heated to a designated temperature. In most of the runs, 2-octanol was used as the diluent. In two runs, included for purposes of comparison, p-cresol and glycerol were employed as the diluent. Methyl lesquerolate was added dropwise while stirring the mixture and keeping it at the designated temperature. After completion of the reaction, the reaction mixture was cooled and a sample withdrawn for preparation of mixed methyl esters and analysis by GLC to determine the proportions of 12-hydroxydodecanoic acid, dodecanedioic acid, and residual lesquerolic acid.

The proportions of reagents, conditions of reaction, and results are tabulated below:

| | Proportions of starting materials [1] | | | Reaction conditions | | Analysis of reaction product [2] | | | Ratio of 12-hydroxy-dodecaoic acid to dodecane-dioic acid |
|---|---|---|---|---|---|---|---|---|---|
| | NaOH, moles | H²O, moles | Diluent moles | Temp., °C. | Time, hrs. | 12-hydroxy-dodecanoic acid, percent | Dodecane-dioic acid, percent | Lesquerolic acid, percent | |
| Run: | | | | | | | | | |
| 1 | 8.5 | 7.5 | p-Cresol, 0.65 | 192 | 7.9 | 34 | 53 | 13 | 0.65/1 |
| 2 | 8.5 | 5.0 | Glycerol, 8.2 | 191 | 24.8 | 0 | 0 | 98 | 0 |
| 3 | 8.5 | 5.0 | 2-octanol, 1.9 | 187 | 10.5 | 63 | 21 | 11 | 3/1 |
| 4 | 8.5 | 5.0 | 2-octanol, 3.8 | 183 | 12.7 | 66 | 14 | 13 | 4.7/1 |
| 5 | 8.5 | 5.0 | 2-octanol, 5.7 | 186 | 22.5 | 64 | 23 | 5 | 2.8/1 |
| 6 | 8.5 | 5.0 | 2-octanol, 3.8 | 183 | 12.6 | 66 | 12 | 9 | 5.6/1 |

[1] 1 mole of methyl lesquerolate in each run.
[2] Excluding diluent and volatile by-products.

EXAMPLE II

The procedure described in Example I was repeated substituting methyl ricinoleate for methyl lesquerolate. The diluents used were 2-octanol and 2-octanone.

The proportions of materials, reaction conditions, and results are tabulated below:

| | Diluent [1] | Reaction conditions | | Analysis of reaction product [2] | | | Ratio of 10-hydroxy-decanoic acid to sebacic acid |
|---|---|---|---|---|---|---|---|
| | | Temp., °C. | Time, hrs. | 10-hydroxy-decanoic acid, percent | Sebacic acid, percent | Ricinoleic acid, percent | |
| Run: | | | | | | | |
| 1 | 2-octanone | 184 | 6.6 | 19 | 67 | | 0.28/1 |
| 2 | 2-octanol | 183 | 11.5 | 80 | 11 | | 7.3/1 |

[1] In each run, proportions of starting materials were:
Methyl ricinoleate, 1 mole
NaOH, 8.5 moles
H₂O, 5.0 moles
Diluent, 3.8 moles.
[2] Excluding diluent and volatile by-products.

Example III

A series of runs were carried out using the following technique in each case.

A 100-ml., thick-walled, "Pyrex" glass reaction vessel was fitted with a stirrer, dropping funnel, and reflux condenser. The reaction vessel was charged with 24 ml. of a selected organic diluent (as specified below), 1.8 ml. of water, and 6.8 g. of sodium hydroxide. The dropping funnel was charged with 6.5 g. of methyl ricinoleate. The reactor was immersed in a silicone oil bath heated to 185–195° C., and the ricinoleate was then introduced dropwise. After all the ricinoleate had been added the mixture was stirred for 12.5 to 13 hours longer while holding the oil bath at 185–195° C. At the end of this period, a 3-gram portion of the reaction product was dissolved in 20 ml. hot water, acidified to pH 1 with 50% aqueous sulfuric acid and extracted with ether. The ether solution was dried with sodium sulfate, and the ether was removed on a rotary evaporator to yield an oily residue which was converted to mixed methyl esters in refluxing excess methanol with 0.5% concentrated sulfuric acid. The resultant ester mixture was analyzed to determine the proportions of 10-hydroxydecanoic acid, sebacic acid, and uncleaved ricinoleic acid in the reaction product. The diluents used and the results obtained are tabulated below.

| Run [1] | Diluent | Type of diluent | Analysis [2] | | | Ratio of 10-hydroxy-decanoic acid to sebacic acid |
|---|---|---|---|---|---|---|
| | | | 10-hydroxy-decanoic acid, percent | Sebacic acid, percent | Ricinoleic acid, percent | |
| a | 1-octanol | Prim. alkanol | 82.6 | 16.5 | 0.5 | 5.0 |
| b | Isooctanol | Com'l mixture of prim. and sec. alkanols | 73.0 | 15.4 | 0 | 4.7 |
| c | Isodecanol | do | 62.0 | 28.6 | 4.8 | 2.2 |
| d | 2-octanol | Sec. alkanol | 80.0 | 11.0 | 0 | 7.3 |
| e | 1:1 mixture of 2-octanol and decalin | Mixture of sec. alkanol and hydrocarbon | 53.0 | 33.0 | 14.0 | 1.6 |
| f | Cyclooctanol | Sec. alkanol | 63.0 | 22.8 | 3.2 | 2.8 |
| g | Diisobutyl alcohol | do | 53.0 | 34.0 | 6.3 | 1.6 |
| h | Phenethyl alcohol | Aromatic alcohol | 14.0 | 31.0 | 51.0 | 0.45 |
| i | 2-methyl-2-nonanol | Tert. alkanol | 18.7 | 75.0 | 6.3 | 0.25 |
| j | Decalin | Hydrocarbon | 31.0 | 55.0 | 14.0 | 0.56 |
| k | α-methylbenzyl alcohol | Aromatic alcohol | 15.0 | 20.0 | 20.0 | 0.75 |

[1] Runs h through k are not illustrative of the invention, but are included for purpose of comparison.
[2] The difference between 100 percent and the total percentages reported represents a mixture of unidentified fragments.

Having thus described the invention, what is claimed is:

1. A process for preparing an acid of the structure $$HO-(CH_2)_{z+2}-COOH$$

wherein z is an integer from 0 to 16, which comprises reacting an unsaturated compound selected from the group consisting of the acids, alkali metal salts, glycerol esters, and loweralkyl esters, which contain the radical $$CH_3-(CH_2)_x-CHOH-(CH_2)_y-CH=CH-(CH_2)_z-\overset{O}{\overset{\|}{C}}$$

wherein $y$ is an integer from 0 to 1, and $x$ and $z$ are each an integer from 0 to 16 with the limitation that the sum of $x$ and $z$ does not exceed 16, with a strong alkali at a temperature of about 178 to 210° C., in the presence of a monohydroxy primary or secondary alkanol having a boiling point of at least 178° C. under atmospheric pressure, and containing up to 17 carbon atoms, the said alkanol being supplied in the amount of at least 2 moles thereof per mole of said unsaturated compound.

2. The process of claim 1 wherein the alkanol is free from branching on the carbon atoms alpha and beta to the carbon atom bearing the hydroxy group.

3. The process of claim 1 wherein the alkanol is a secondary alkanol.

4. The process of claim 1 wherein the alkanol is 2-octanol.

5. The process of claim 1 wherein the alkanol is a primary alkanol.

6. The process of claim 1 wherein the alkanol is 1-octanol.

7. The process of claim 1 wherein the alkanol is a mixture of primary and secondary alkanols.

8. The process of claim 1 wherein the alkanol is iso-octanol.

9. The process of claim 1 wherein the alkanol is iso-decanol.

10. The process of claim 1 wherein $x$ is 5, $y$ is 1, and $z$ is 7.

11. The process of claim 1 wherein $x$ is 5, $y$ is 1, and $z$ is 9.

12. The process of claim 1 wherein the product is 10-hydroxydecanoic acid, the starting compound is methyl ricinoleate, and the alkanol is 2-octanol.

13. The process of claim 1 wherein the product is 10-hydroxydecanoic acid, the starting compound is castor oil, and the alkanol is 2-octanol.

14. The process of claim 1 wherein the product is 12-hydroxydodecanoic acid, the starting compound is methyl lesquerolate, and the alkanol, is 2-octanol.

15. The process of claim 1 wherein the product is 12-hydroxydodecanoic acid, the starting compound is lesquerella oil, and the alkanol is 2-octanol.

References Cited

UNITED STATES PATENTS

| 2,318,762 | 5/1943 | Davis et al. | 260—398 |
| 2,674,608 | 4/1954 | Dupont et al. | 260—406 |

FOREIGN PATENTS

| 534,321 | 3/1941 | England. | |

ALEX MAZEL, Primary Examiner

R. V. RUSH, Assistant Examiner

U.S. Cl. X.R.

260—535